United States Patent [19]

Taylor et al.

[11] 4,072,785

[45] Feb. 7, 1978

[54] DIMENSIONALLY STABLE, NITROCELLULOSE COATED CELLOPHANE

[75] Inventors: John S. Taylor, Newark; William G. Grantham, Wilmington, both of Del.

[73] Assignee: FMC Corporation, Philadelphia, Pa.

[21] Appl. No.: 486,025

[22] Filed: July 5, 1974

[51] Int. Cl.² ............................................. B44D 1/092
[52] U.S. Cl. ................................. 428/536; 427/390 R; 427/394; 427/407 D; 427/415
[58] Field of Search .............. 117/73, 76 F, 144, 145; 427/396, 407 D, 415, 390 R, 394; 428/536

[56] References Cited

U.S. PATENT DOCUMENTS

| | | |
|---|---|---|
| 2,796,362 | 6/1957 | Wooding et al. .................. 117/76 X |
| 3,011,910 | 12/1961 | Hagan et al. ...................... 117/76 X |
| 3,043,713 | 7/1962 | Boyer ................................. 117/145 X |
| 3,656,993 | 4/1972 | Edwards et al. ................. 117/145 X |

*Primary Examiner*—Michael R. Lusignan
*Attorney, Agent, or Firm*—Eugene G. Horsky

[57] ABSTRACT

An improved plasticized regenerated cellulose film, and particularly a plasticized regenerated cellulose film having a moistureproofing, solvent-sealable coating in which plasticizer migration into the coating is at least minimized, and a process for making such film.

12 Claims, No Drawings

DIMENSIONALLY STABLE, NITROCELLULOSE COATED CELLOPHANE

This invention is directed to an improved plasticized regenerated cellulose film, and more specifically to a plasticized regenerated cellulose film in which plasticizer migration is at least minimized, and to a process for making such film.

Conventional regenerated cellulose films plasticized with glycerine and/or propylene glycol, for example, are hygroscopic. Thus, such plasticized films lack a degree of dimensional stability which is essential in certain packaging applications, such as in overwrapping of cigarette packs, and especially packs containing the longer 100 mm cigarettes. Hydroxyethyl cellulose films plasticized with glycerine exhibit good dimensional stability but are difficult to produce without considerable waste and are much softer and physically weaker than the conventional regenerated cellulose films which are desired by users.

Regenerated cellulose films plasticized with polyethylene glycol are also less hygroscopic than the conventional films described above and thus possess the requisite dimensional stability. Moreover, such films are strong, stiff and perform well in automatic wrapping machines. Unfortunately, lacking in the art is a satisfactory moistureproofing, solvent-sealable (non-heat sealing) nitrocellulose formulation which can be coated onto regenerated cellulose films, having a desired level of polyethylene glycol plasticizer, without significant sacrifice in the moistureproofing and/or other desirable characteristics of such coating.

More particularly, conventional moistureproofing solvent-sealable nitrocellulose coatings applied to regenerated cellulose films which are plasticized with polyethylene glycol experience a significant deterioration, apparently as a result of plasticizer migration from the film and into such coating. This migration of the polyethylene glycol plasticizer may occur after and/or during the coating application and, in the latter instance, may well be dissolved in the nitrocellulose coating. The exact manner by which the polyethylene glycol enters and reacts with the nitrocellulose coating has not been determined. However, the effect is clear, and that is a plasticization of the nitrocellulose coating. This, in turn, causes objectionable blocking to occur between packages wrapped in such films and a marked increase in the rate at which moisture is transmitted through the coated film, with products wrapped in such film exhibiting poor keeping properties. Accordingly, a primary object of this invention is to provide a new or generally improved and more satisfactory plasticizer regenerated cellulose film, and a process for making the same.

Another object is the provision of a regenerated cellulose film plasticized with polyethylene glycol in which plasticizer migration is at least minimized.

Still another object is the provision of an improved dimensionally stable, non-blocking, moistureproof coated regenerated cellulose film, and a process for making the same.

A further and more specific object is the provision of a regenerated cellulose film plasticized with polyethylene glycol and having a barrier which at least minimizes and, more desirably, prevents plasticizer migration into an overlying moistureproofing, solvent-sealable nitrocellulose coating, and a process for making such coated film.

These and other objects are accomplished in accordance with the present invention by a plasticized regenerated cellulose film containing an amount of water-soluble methyl cellulose and/or methyl hydroxyalkyl cellulose effective to at least minimize plasticizer migration, and more specifically, to a dimensionally-stable regenerated cellulose film, plasticized with polyethylene glycol and having a moistureproofing, solvent-sealable nitrocellulose coating, in which a water-soluble methyl cellulose and/or water-soluble methyl hydroxyalkyl cellulose serves as a barrier to migration of plasticizer from such film. In this manner, plasticization, and the accompanying sacrifice in the non-blocking and moisture barrier properties of the solvent-sealable nitrocellulose coating is at least minimized, if not completely avoided.

In the process of the present invention, a purified gel regenerated cellulose film is passed through an aqueous solution containing polyethylene glycol, which serves as a plasticizer for the film, and a water-soluble methyl cellulose and/or methyl hydroxyalkyl cellulose, after-which the film is dried. Sufficient of the above-mentioned water-soluble cellulose ethers is maintained in the aqueous solution as to provide the dried film with an amount thereof which is effective to at least minimize the migration of the plasticizer. Preferably, a coating anchoring agent, as for example, a conventional melamine-formaldehyde prepolymer, is also contained in the aqueous solution and applied to the gel film during its passage through such solution. After drying, the plasticized film is coated with a moistureproofing, film-forming, non-heat sealing nitrocellulose solvent solution and then heated to evaporate the coating solvents.

The manufacture of the purified gel regenerated cellulose film is well known and, briefly, involves the extrusion of viscose as a continuous sheet into a coagulating bath where it is transformed into a coherent film, afterwhich this film is regenerated and then purified by being washed, desulphurized and bleached. Since the solutions used in these treatments are aqueous, the purified film contains well over 200 percent water, based on the cellulose content of the film and is thus in a highly-swollen or gel state. Using the so called "double-casting" technique as described, for example, in U.S. Pat. No. 3,044,115 issued to Craver et al, two purified gel films may be simultaneously formed and then plasticized and otherwise treated in accordance with the present invention.

Following the teachings of the present invention, the purified gel film is passed directly into the aqueous solution or bath which contains as a plasticizer, a polyethylene glycol having an average molecular weight of from about 285 to 4,000 and which is present in an amount of from about 5 to 17 percent by weight. The greater the polyethylene glycol plasticizer concentration in the resulting film, the easier it is to slit such film and greater is the productivity. However, in the absence of the teachings of the present invention, incorporating into the film high concentrations of polyethylene glycol plasticizer, say from 16 to 17 weight percent, aggravates the blocking tendency of such film. A plasticizer bath temperature of about 40° C is preferred.

Included in the plasticizer bath or as a separate aqueous solution or bath is the water-soluble methyl cellulose and/or methyl hydroxyalkyl cellulose, such as hydroxypropylmethyl cellulose and hydroxybutylmethyl cellulose. As indicated, the cellulose ethers employed are water-soluble amd may be used alone or in combination with each other.

As is well known in the art, alkali cellulose which is methylated, as with methyl chloride, to effect the substitution of from about 1.5 to 2.4 methyl groups per hydroglucose unit along the cellulose chain provides an ether which is water-soluble. Hydroxypropylmethyl cellulose and hydroxybutylmethyl cellulose are made in a similar manner, using propylene oxide and 1,2-butylene oxide, respectively, in addition to methyl chloride. These cellulose gums are commercially available from The Dow Chemical Company under the trademark METHOCEL and have long been used as thickeners for various solutions. However, in accordance with present invention, these particular soluble cellulose ethers serve effectively to minimize or prevent the migration of plasticizer from the film and into a coating material which is subsequently applied thereto.

To be effective for the intended purpose the concentration of the above-noted water-soluble cellulose ethers in the aqueous solution must not be less than about 0.3% by weight and may range up to about, 1.25% by weight in the absence of an anchoring agent, but should not exceed about 0.75% by weight when such coating anchoring agent is employed. Exceeding the above-mentioned amounts, particularly in the present of a coating anchoring agent, is accompanied by a serious risk that the cellulose ether which is applied to such film will be picked-off on to drying rolls during its final drying. Further, with films formed by the double-casting techinque, incorporating more than 0.75% by weight of such water-soluble cellulose ethers with an anchoring agent in the aqueous solution tends to encourage an objectionable adherence between such films during the subsequent drying thereof. The temperature of this aqueous solution must be as to maintain the cellulose ether in solution, as for example less than about 50° C when using methyl cellulose.

Of significance is that only water-soluble cellulose ethers, as described above and employed in accordance with the teachings of the present invention, have successfully minimized or prevented the migration of polyethylene glycol plasticizer from the regenerated cellulose film and into an overlying nitrocellulose material. Examples of water-soluble additives which have been established as ineffective for the intended purpose of preventing migration of polyethylene glycol plasticizer include hydroxypropyl cellulose; hydroxyethyl cellulose; sorbitol; ethyoxylated starch; polyethylene oxide (Polyox WSR205 - Union Carbide Corp.); sodium carboxymethyl cellulose; cationic acrylic resin (RETIN 300 — Hercules, Inc.); glycerine capped polyethyl glycol (CE - 600 — The Dow Chemical Co.); sodium sulfate; PEG 1000 and PEG 1540 MONOSTEARATE (Armak Chemical); cationic starch; and a linear anionic fluorochemical emulsion (Fluorochemical FC-808 (3M).

To insure tenacious adherence of coating material which is subsequently applied to the film, a conventional coating anchoring agent is preferably added to the aqueous solution containing a water-soluble cellulose ether as described above, and is applied to the gel film during its passage therethrough. The presence of a coating anchoring agent, or a particular anchoring agent, is not essential but does assist in preventing migration of the polyethylene glycol plasticizer and is therefore preferred. More specifically, the presence of such anchoring agent effects a cross-linking of the cellulose and cellulose derivatives during the heating of the film, which results in retarding plasticizer migration and enhances the retention of the coating material to the base film.

Anchoring agents or resins which may be used comprise the water-soluble or water-dispersible incompletely condensed synthetic type which are capable of being rapidly converted in situ to the insoluble state or cured at a temperature normally encountered in the usual film drying stage. Such resins, in their completely polymerized state, include phenol-formaldehyde resins, dimethylol urea resins, dimethylol urea ether resins, melamine-formaldehyde resins, amino-triazine aldehyde resins; aldehyde condensation products, such as casein formaldehyde, guanidine formaldehyde, aliphatic and aryl ketones with formaldehyde, urethane aldehyde and cyanamide aldehyde; furfuramide resins and furfural reaction products with amines, phenols, and ketones; thiocyanate resins; thio-urea resins; acroleinurea resins; and urea-aldehyde modified phthalic acid glycerol resins. As in conventional methods, the anchoring agent or resin may be employed in the process of the present invention in amounts ranging from about 0.15 to 0.3% or more by weight.

Water-soluble or dispersible prepolymers of melamine-formaldehyde condensation resins as hereafter referred to, particularly in the examples, are available commercially from American Cyanamid Co. under the trademark ACCOBOND.

Preferably, the coating anchoring agent, water-soluble methyl cellulose and/or water-soluble methyl hydroxyalkyl cellulose, and polyethylene glycol plasticizer are contained in one aqueous bath. If desired, a two bath system may be used to simplify plasticizer recovery procedures, with only the second of such baths containing both the coating anchoring agent and one or more of the water-soluble cellulose ethers described. Both of such baths would contain like concentrations of polyethylene glycol plasticizer, with plasticizer being added to the second of such baths at the start of operations and then maintained at a desired level by carry-over from the first of the two baths. The second of such baths, however, would not be circulated through a recovery system.

The now plasticized gel film, containing both water-soluble cellulose and coating anchoring agent, is dried in the conventional manner by being laced about and advanced by a series of rollers heated to various temperatures ranging from about 70° to about 120° C.

The dried regenerated cellulose film is then coated in the conventional manner using a known moistureproofing, solvent-sealing (non-heat sealing) film forming nitrocellulose coating material. Typical formulations of such known nitrocellulose coating materials include:

| | Parts |
|---|---|
| Nitrocellulose | 35-55 |
| Total Plasticizer | 32-44 |
| Blending Resin | 18-30 |
| Moistureproofing Agent | 3-6 |
| Slip Agents | 1-3 |

Typical plasticizers include octyl diphenyl phosphate, dicyclohexyl phthalate and dimethylcyclohexyl phthalate, and may be used alone or in combination with each other. A variety of blending resins may be used, such as ester gum, copal, dammar, maleic-modified resin esters, etc. Paraffin wax is preferred as the coating moistureproofing agent, although other waxes and synthetic wax-like materials may be used alone or in combination. Preferred slip agents include clays and talcs but other mineral or particulate materials may be used.

Mixtures of solvents and/or diluents, such as ethyl acetate, butyl acetate, butyl alcohol, ethyl alcohol, toluene, etc., are used in sufficient quantity with the nitrocellulose coating material to form a solution containing 1 to 15% solids, by weight, depending upon the viscosity of the nitrocellulose. This solution of coating material is applied as an extremely thin layer onto one or both sides of the dried regenerated cellulose film, after-which the coated film is heated as to about 110° C to evaporate the coating material solvents. This coated film is then reconditioned at 72° C dry bulb and 63° C wet bulb temperatures and collected as a wound roll.

To demonstrate the merits of the present invention, reference is made to the following examples in which concentrations of materials are set forth on a weight basis, unless otherwise indicated, and in which a like moistureproofing, solvent-sealable (non-heat sealing) nitrocellulose coating composition was employed, as follows:

|  | Parts |
| --- | --- |
| Nitrocellulose | 46.5 |
| Dicyclohexylphthalate | 17.5 |
| Dimethylcyclohexyl phthalate | 17.5 |
| Blending resins | 30. |
| Paraffin wax | 6.0 |
| Clay | 1.8 |

Using a mixture of toluene, butyl acetate, ethyl acetate, ethyl alcohol and butyl alcohol the above composition was dissolved to provide a solution containing 15% solids by weight.

In the following examples, the regenerated cellulose film had an average thickness of about 0.9 mil and the coating material was applied to the film to provide on each side thereof coating having thickness of from about 0.1 to 0.25 mil. The coated films produced were tested and characterized in terms conventional in the art, in which:

"Blocking" is an indication of the degree of sticking or adhesion of the coated film to itself after six hours storage at 52° C, except where noted otherwise. This characteristic may be designated by a rating of from 1, which indicates that overlying layers of film slide apart freely with little pressure, to 5, which indicates that overlying film layers cannot be separated without destroying the coatings.

"Wetting" is the extruding of the plasticizer from the base film or coating which causes the film to take on an oily wet appearance. A wet film usually shows poor and greasy slip properties in machine operations, especially in push-feed operations. Rating, as measured or observed during the blocking test described above, range from 1 to 5. A film having a rating of 1 exhibits no wetting, while a film having a rating of 5 shows bad wetting.

"Slip" designates the friction or lack of friction between adjacent surfaces of film layers.

"MVTR" is the moisture vapor transmission rate, in grams per square meter per 24 hour period through the coated film, placed across a cup containing calcium chloride, at a temperature of 38° C with a relative humidity of 95% maintained on one side of the film and a relative humidity of 5% on the other side thereof.

"Heat Seal" is the measure of the force in grams required to pull apart two strips of the coated films which have been heated together at 135° C under a pressure of 20 pounds per square inch for ½ second to provide a two inch seal. In this particular instance the heat seal values are an indication of the attack made by the polyethylene glycol plasticizer on the coating material, with such values increasing with the degree plasticizer migration into the film coating.

"Haze" represents the degree of film clarity and is determined by measurement of scattered light. The lower the haze number, the greater the amount of light being transmitted through such film.

EXAMPLES I – VI

Purified gel regenerated cellulose films, formed in the conventional manner as heretofore described, were passed through individual aqueous baths, as defined below, and then dried. The dried regenerated cellulose films were coated with the above coating lacquer, heated to evaporate the coating solvents, reconditioned and collected in roll form.

The characteristics of these films, with blocking being determined under the severe condition of 125° C, were as follows:

| Example | Bath Composition | Oven Blocking (125°) | Wetting | Slip | MVTR | Heat Seal | % Plasticer on Film |
| --- | --- | --- | --- | --- | --- | --- | --- |
| I | A | 4 | 4 | Good | 4.9 | 272 | 8.6 |
| II | B | 4 | 5 | Good | 5.4 | 500 | 10.1 |
| III | C | 1+ | 1+ | Excellent | 4.8 | 42 | 11.7 |
| IV | D | 2-3 | 5 | Good | 5.2 | 222 | 9.4 |
| V | E | 2 | 1-2 | Excellent | 5.2 | 208 | — |
| VI | F | 1-2 | 1-2 | Excellent | 3.5 | 158 | — |

A - 6% polyethylene glycol (PEG-400), having an average molecular weight of about 400.
B - A, plus 0.25% melamine-formaldehyde precondensate resin (ACCOBOND).
C - A, plus 0.30% melamine-formaldehyde precondensate resin (ACCOBOND) and 0.75% of water-soluble methyl cellulose (METHOCEL MC-25) mixed directly into bath.
D - C, with methyl cellulose content reduced to 0.35%.
E - C, with no melamine-formaldehyde precondensate resin.
F - D, with no melamine-formaldehyde precondensate resin.

EXAMPLE VII

The procedure of Example III was followed, except that the water-soluble methyl cellulose was mixed in hot water and then clarified with ice at 0°–5° C before being added to the plasticizer bath. The resulting coated film had a plasticizer content of 9.3% and displayed properties, as follows:

| Blocking | 1+ |
| --- | --- |
| Wetting | 1+ |
| Slip | good |
| MVTR | 4.8 gms/in²/24 hours |

| | |
|---|---|
| -continued | |
| Heat Seal | 150 gms/2" |

EXAMPLE VIII

A film was treated in a manner as described in Example III with the exception that the bath polyethylene glycol content (PEG-400) was increased to 8.0%. The blocking and wetting characteristics of the resulting coated film were as follows:

| | |
|---|---|
| Blocking | 1 |
| Wetting | 1 |

EXAMPLES IX AND X

Coated films were produced using, in one instance (Example IX), a plasticizer bath containing 6.5% polyethylene glycol (PEG-400) and, in the second instance (Example X), the same plasticizer bath to which was added 0.75% of a methyl cellulose (METHOCEL MC-15) and 0.30% of melamine-formaldehyde resin (ACCOBOND). The respective films had plasticizer contents of 13% and 14%, and were overwrapped onto packages. The characteristics of the film were as follows:

| | Example IX | Example X |
|---|---|---|
| Coating Weight | 3.8 | 3.9 |
| Film Blocking | 2 | 1 |
| Packaging Blocking | 3.5 | 2 |
| MVTR | 7.7 gms/m$^2$/24 hours | 3.9 gm/m$^2$/24 hours |
| Heat Seal | 182 gms/2" | 55 gms/2" |
| Package Seal | good | good |
| Haze | 3.5 | 3.0 |

It is to be understood that changes and variations may be made without departing from the spirit and scope of the invention as defined in the appended claims.

We claim:

1. A process which includes the steps of passing a purified gel regenerated cellulose film through an aqueous solution containing, as a plasticizer for such film, polyethylene glycol having an average molecular weight between 285 and 4,000 and a water-soluble cellulose ether having a concentration not less than about 0.3% by weight in the aqueous solution and selected from the group consisting of methyl cellulose and hydroxyalkyl methyl cellulose and mixtures thereof, and thereafter drying the plasticized gel regenerated cellulose film, the water-soluble cellulose ether in the aqueous solution being sufficient to provide the dried film with an amount thereof which is effective to at least minimize the migration of the plasticizer.

2. A process as defined in claim 1 wherein the aqueous solution contains from 0.3 to 1.25% by weight of the water-soluble cellulose ether.

3. A process as defined in claim 2 wherein the water-soluble cellulose ether is selected from the group consisting of methyl cellulose and hydroxypropyl methyl cellulose and mixtures thereof.

4. A process as defined in claim 1 wherein the aqueous solution contains from 5 to 17% by weight of polyethylne glycol.

5. A process as defined in claim 3 wherein the aqueous solution contains from 5 to 17% by weight of polyethylene glycol.

6. A process as defined in claim 5 further including the step of applying to the dried film a moistureproofing, solvent-sealable, nitrocellulose coating.

7. A process as defined in claim 1 wherein the water-soluble ether is present in an amount not exceeding about 0.75% and wherein the aqueous solution further includes a partially polymerized condensation product which is at least water-dispersible and which is converted to an insoluble state during the drying of the film.

8. A process as defined in claim 6 wherein the water-soluble ether is present in an amount not exceeding about 0.75% and wherein the aqueous solution further includes a partially polymerized condensation product which is at least water-dispersible and which is converted to an insoluble state during the drying of the film.

9. A regenerated cellulose film plasticized with water-soluble polyethylene glycol having an average molecular weight between 285 and 4,000 and containing an amount of water-soluble cellulose ether, selected from the group consisting of methyl cellulose and hydroxyalkyl methyl cellulose and mixtures thereof, effective to at least minimize plasticizer migration.

10. A film as defined in claim 9 wherein the water-soluble cellulose ether is selected from the group consisting methyl cellulose and hydroxypropyl methyl cellulose and mixtures thereof.

11. A film as defined in claim 10 further including a moistureproofing, solvent-sealable nitrocellulose coating.

12. A film as described in claim 11 further including a coating anchoring agent comprised of partially polymerized condensation product which has been cured in situ on the film prior to application of said coating.

* * * * *

UNITED STATES PATENT AND TRADEMARK OFFICE
CERTIFICATE OF CORRECTION

PATENT NO. : 4,072,785
DATED : February 7, 1978
INVENTOR(S) : John S. Taylor and William G. Grantham It is certified that error appears in the above-identified patent and that said Letters Patent are hereby corrected as shown below:

Column 1, line 52, "plasticizer" should read -- plasticized --.
Column 2, line 52, after the word "plasticizer," delete the word "a". Column 3, line 1, "amd" should read -- and --; line 27, "ent" should read -- ence --. Column 4, line 2, after "migration and" insert the word "also"; line 52, "film forming" should read -- film-forming --. Column 8, line 12, "thylne" should read -- thylene --; line 49, "described" should read -- defined --.

Signed and Sealed this

Fifteenth Day of May 1979

[SEAL]

Attest:

RUTH C. MASON
Attesting Officer

DONALD W. BANNER
Commissioner of Patents and Trademarks